(12) United States Patent
Bracalente et al.

(10) Patent No.: US 8,348,147 B2
(45) Date of Patent: Jan. 8, 2013

(54) METHOD AND APPARATUS FOR TRACKING THE LOCATION OF A DIGITAL MEDIA PLAYER DEPLOYED IN A NETWORK

(75) Inventors: Robert M. Bracalente, Wake Forest, CA (US); John A. Toebes, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 227 days.

(21) Appl. No.: 12/972,717

(22) Filed: Dec. 20, 2010

(65) Prior Publication Data

US 2012/0153017 A1 Jun. 21, 2012

(51) Int. Cl.
*G06F 17/00* (2006.01)
(52) U.S. Cl. ............ 235/375; 235/380; 463/20; 463/25
(58) Field of Classification Search .................. 235/375, 235/380; 463/20, 25
See application file for complete search history.

(56) References Cited

U.S. PATENT DOCUMENTS

| | | | |
|---|---|---|---|
| 2008/0176627 A1* | 7/2008 | Lardie | 463/20 |
| 2011/0035046 A1* | 2/2011 | Ward | 700/215 |
| 2012/0007711 A1* | 1/2012 | Lehnbeuter | 340/5.6 |

* cited by examiner

*Primary Examiner* — Allyson Trail
(74) *Attorney, Agent, or Firm* — P. Shu

(57) ABSTRACT

In one embodiment, a method includes obtaining documentation that includes a first identifying code and information relating to a deployment of a media device. The method also includes deploying the media device at a location, wherein deploying the media device at the location includes connecting the media device to a display device, as well as causing a second identifying code to be displayed on the display device, the second identifying code being indicative of an association between the display device and the media device. The first identifying code and the second identifying code are captured, and paired. When the first identifying code is paired with the second identifying code, the location is a designated point-of-deployment for the media device.

20 Claims, 7 Drawing Sheets

METHOD AND APPARATUS FOR TRACKING THE LOCATION OF A DIGITAL MEDIA PLAYER DEPLOYED IN A NETWORK

The disclosure relates generally to deploying digital media players in networks and, more specifically, to substantially minimizing the likelihood of human error associated with the placement of digital media players within large scale networks.

BACKGROUND

During the large scale deployment of digital media players (DMPs), such as Cisco DMPs available from Cisco System, Inc. of San Jose, Calif., a significant amount of time and effort is often spent to properly locate each DMP. Attempting to correctly designate an exact spatial location at which a DMP is to be located is generally time-consuming, as the designation must be accurate enough to reduce the likelihood that the DMP will be improperly located, e.g., by an installer. Further, the time and effort associated with correcting mistakes associated with improperly designating a location of a DMP, incorrectly connecting a DMP at a given location, and/or associated with deploying a DMP at an incorrect location, is often significant.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

Figure 1:
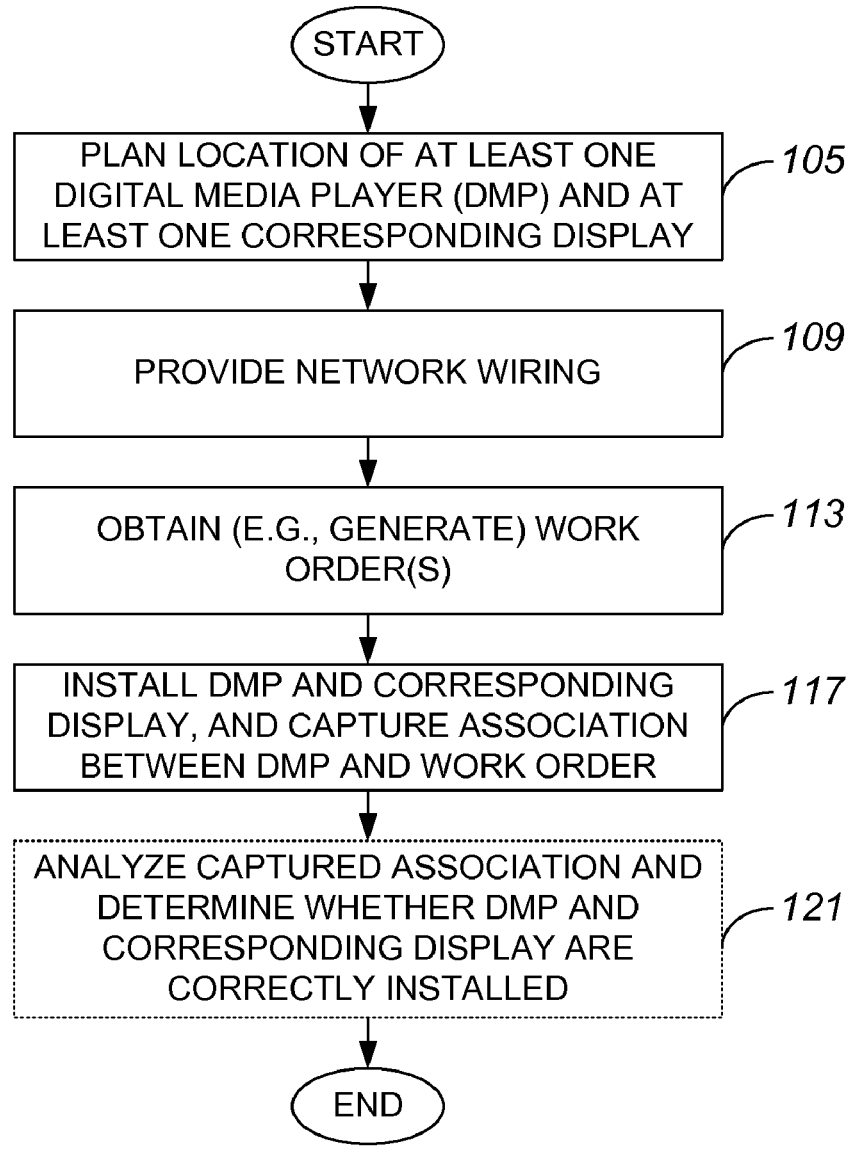
FIG. 1 is a process flow diagram which illustrates a method of deploying a digital media player (DMP) in a large scale system in accordance with an embodiment.

According to one aspect, a method includes obtaining documentation that includes a first identifying code and information relating to a deployment of a media device. The method also includes deploying the media device at a location, wherein deploying the media device at the location includes connecting the media device to a display device, as well as causing a second identifying code to be displayed on the display device, the second identifying code being indicative of an association between the display device and the media device. The first identifying code and the second identifying code are captured, and paired. When the first identifying code is paired with the second identifying code, the location is a designated point-of-deployment for the media device.

Description

Human intervention is typically associated with the deployment of digital media players (DMPs). For example, installers are generally responsible for bringing an "out of the box" DMP to a spatial location, wiring the DMP, and designating the DMP as being associated with the location. An "out of the box" DMP may generally be a DMP that is effectively unknown, and has not yet been associated with a location. In some instances, installers may be responsible for bringing a particular DMP to a location, wiring or otherwise connecting the DMP to a display and a network at the location, and preparing a record which indicates that the DMP has been deployed at the location. With the amount of human intervention associated with the deployment of DMPs, mistakes are not uncommon. Mistakes include, but are not limited to including, mislabeling or incorrectly connecting cables associated with a DMP, placing the DMP at an incorrect location such as a room, and connecting a DMP to the wrong display. In other words, human error is often associated with the deployment of DMPs and the capturing of information associated with the deployment of DMPs.

Identifying and rectifying mistakes associated with the deployment of a DMP is often time-consuming. For example, if a display to which a DMP is connected shows that the display is receiving a signal, an installer may not readily identify that the location of the DMP as reported to an overall large scale system is incorrect. If a particular DMP is not at its designated location, the performance of an overall large scale system that utilizes the DMP, and relies on the DMP being located at its designated location, may be compromised.

By designating a spatial location of a DMP at a point of deployment and capturing the designation of the spatial location using a scanning devicet, the potential for human error may be substantially minimized by essentially eliminating the need for humans to manually record deployment data on paper and/or spreadsheets. In one embodiment, a DMP location scanner may be configured to scan an identifying code associated with a DMP that is displayed on a display screen once the DMP is connected to the display screen, and to scan an identifying code displayed on a work order. The scanned codes may be compared or otherwise processed to ascertain whether the DMP is in the correct location and properly connected. It should be appreciated that the scanned codes may be non-identical and paired, or the scanned codes may be identical. In other words, a code for a DMP and a code for a location may be different but paired, or a code for a DMP and a code for a location may be identical.

Scanning codes, e.g., quick response (QR) codes or bar codes, associated with a DMP and codes printed on documentation associated with a deployment, e.g., a work order, allows for the location at which the DMP is deployed to be designated. In a non-installation scenario, e.g., in a verification scenario which occurs when a change is to be made in installation, the scanning of codes using a scanning device allows for an efficient and accurate determination that the DMP is not at an expected location, or is not connected to an expected cable. As such, errors associated with the deployment of the DMP may be addressed relatively quickly and, thus, efficiently.

Referring initially to FIG. 1, a method of deploying a DMP in a large scale system will be described in accordance with an embodiment. A method 101 of deploying, or otherwise setting up, a DMP at a particular location associated with a large scale system begins at step 105 in which a location at which at least one DMP is to be located, and at which at least one display to which the DMP may be connected, is planned. Planning a location typically includes identifying a suitable spatial location at which DMPs and corresponding display screens are to be deployed. It should be appreciated that such planning may include entering, and/or otherwise maintaining, information relating to the DMPs in a system, e.g., on a server associated with the large scale system. Such information may include, but is not limited to including, identifying information for DMPs such as media access controls (MACs) or internet protocol (IP) addresses, identifiers for the locations at which the DMPs are to be deployed, and information relating to the number of DMPs to be deployed.

Once the location of at least one DMP is planned, network wiring may be provided in step 109. Providing network wiring may include laying and/or installing power and networking cables. Cables may be laid from a central location to each of the locations at which a DMP, as well as a corresponding display, is to be located. After network wiring is provided, documentation such as work orders relating to the installation of DMPs and corresponding displays may be obtained or otherwise generated in step 113. Work orders may be generated based on locations that were planned in step 105. In one embodiment, the work orders include identifying codes, e.g., QR codes and/or bar codes, associated with DMPs. It should be appreciated that a substantially immutable key, as for example a media access control (MAC) address or a system-generated designator, may be a code associated with a DMP. The work orders, upon being generated, are typically provided to an installer who is responsible for installing the DMPs and corresponding displays.

In step 117, each DMP and corresponding display may be installed in a desired location or point of deployment. Additionally, the DMP and the corresponding display are powered on to determine whether the DMP and the corresponding display are connected. An association between each DMP and a work order may be captured once the DMP and the corresponding display are connected. Capturing the association between a DMP and a work order may include, for example, using a scanner to scan in a code associated with the DMP and is displayed on the corresponding display, as well as a code associated with the DMP and provided on the work order. In one embodiment, the code associated with the DMP is displayed on the corresponding display as a part of a set-up or configuration screen that is arranged to facilitate the deployment of the DMP. In general, after the code associated with the DMP is displayed on a display and scanned, or after a predetermined amount of time, the code may cease being displayed. One process of installing a DMP and a corresponding display, and of capturing an association between the DMP and a work order, will be described below with reference to FIG. 2.

After the association between each DMP and a work order is captured, the captured association information is analyzed in step 121 to determine whether the DMP and the corresponding display are correctly installed. It should be appreciated that step 121 may not be included, for example, if an "out of the box" DMP is being installed. That is, step 121 is an optional step that may be applicable for an embodiment in which a particular DMP is to be associated with a particular location. In one embodiment, a scanner used to scan in or otherwise obtain a code associated with a DMP that is displayed on a display as well as a code provided on a work order may provide the codes to a server for analysis. It should be appreciated, however, that a scanner may instead analyze the obtained codes. Analyzing the codes or, more generally, information associated with a DMP may include identifying whether the codes indicate that the DMP is correctly installed, e.g., in a correct location and connected to an appropriate network connection. If an analysis of the codes results in a determination that the DMP is not correctly installed, the DMP installed may display its code on a display such that the fact that the DMP is not correctly installed may be readily apparent. One method of analyzing the association between each DMP and a work order will be discussed below with respect to FIG. 3. After the association between each DMP and a work order is analyzed, the method of deploying, or otherwise setting up, a DMP at a particular location associated with a large scale system is completed.

Figure 2:
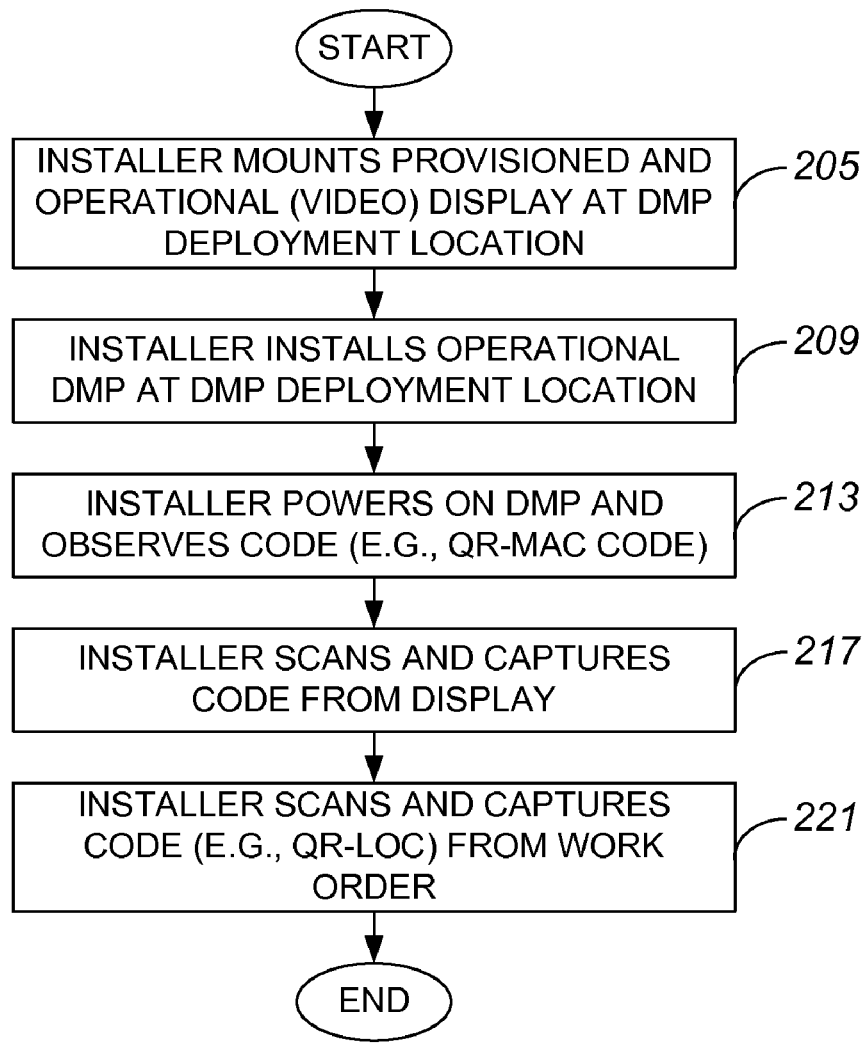
FIG. 2 is a process flow diagram which illustrates a method of installing and associating a DMP and a corresponding display, e.g., step 117 of FIG. 1, in accordance with an embodiment.

FIG. 2 is a process flow diagram which illustrates a method of installing a DMP and a corresponding display, e.g., step 117 of FIG. 1, in accordance with an embodiment. A method 117 of installing a DMP and a corresponding display, and of capturing an association between the DMP and a work order, begins at step 205 in which an installer mounts a provisioned and operational display, e.g., a video display, at a DMP deployment location. In general, the DMP deployment location is a spatial location at which a DMP is to be installed. Installing a display may include, but is not limited to including, providing electrical connections to the display. A display may be associated with any suitable display device that is capable of displaying images, e.g., video images, provided by a DMP.

In step 209, an installer installs an operational DMP at the DMP deployment location. Installing a DMP may include, but is not limited to including, providing electrical connections, providing network connections, and providing a connection between the DMP and the display at the DMP deployment location. Installing the DMP at the DMP deployment location also includes verifying that the connections are sound, e.g., verifying the proper installation of substantially all cables.

After the DMP is installed at a DMP deployment location, the installer powers on the DMP in step 213 and observes a code that is displayed on the display. The code, which may be a QR code such as a QR-MAC code in one embodiment, may be displayed as part of an installer template that provides information that may be used by the installer to complete an installation process.

The installer scans and captures the code, e.g., a QR-MAC code, displayed on the display in step 217. Scanning and capturing a code from the display may include utilizing a DMP location scanner to scan and capture the code. A DMP location scanner may be a handheld location scanner that an installer may carry. Once a code is scanned and successfully captured, a DMP location scanner may provide an indication to verify a successful capture. A successful capture may results in a visual and/or an audio indication provided by the DMP location scanner. Examples of suitable DMP location scanners will be described below with reference to FIGS. 6 and 7.

After the installer scans and captures code from the display, the installer scans and captures code, e.g., a QR code such as a QR-LOC code, from a work order in step 221. In one embodiment, such as an embodiment in which particular DMPs are to be associated with particular spatial locations, each QR-MAC code may be uniquely paired to a QR-LOC code such that each QR-MAC code may match substantially only one QR-LOC code. It should be appreciated that while paired QR-MAC and QR-LOC codes may be identical, paired QR-MAC and QR-LOC codes are typically different but are uniquely associated with each other, as for example during an initial installation process. Once the installer has successfully captured the code from the work order, the method of installing a DMP and a corresponding display, and of capturing an association between the DMP and a work order, is completed.

Figure 3:
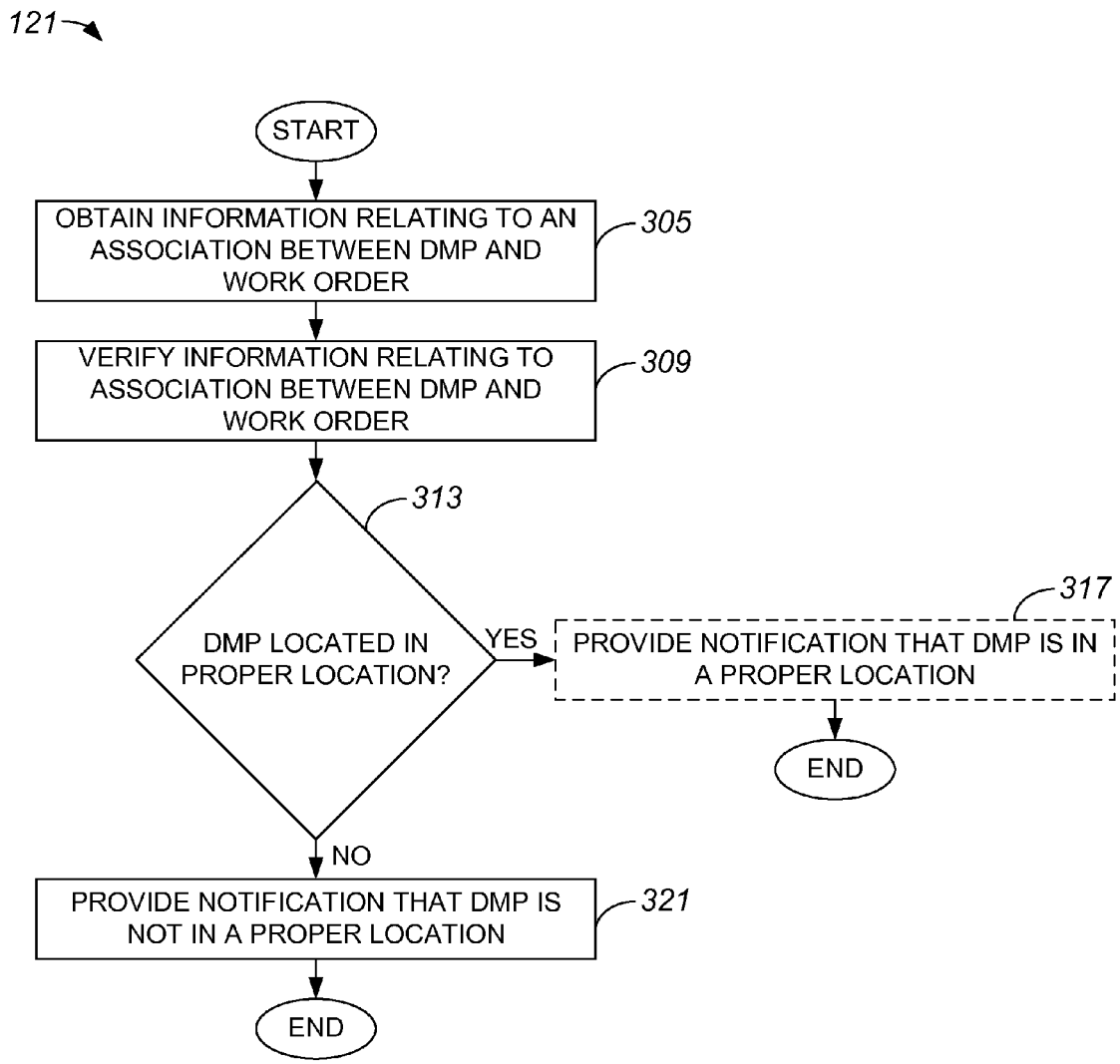
FIG. 3 is a process flow diagram which illustrates a method of analyzing captured information relating to an association between a DMP and a display, e.g., step 121 of FIG. 1, in accordance with an embodiment.

Upon being captured, QR codes and other information effectively associated a DMP with a spatial location. QR codes and other information may be used, as for example after an initial installation, to verify whether a DMP continues to be located at a correct, or expected, location. In general, an analysis of captured QR codes and other information may either be performed by a DMP location scanner that captures the QR codes or by a server that obtains the QR codes from the DMP location scanner. FIG. 3 is a process flow diagram which illustrates a method of analyzing captured information relating to an association between a DMP and a display, e.g., step 121 of FIG. 1, in accordance with an embodiment. A method 121 of analyzing captured information begins at step 305 in which information relating to an association between a DMP and a work order is obtained. The information may generally include QR codes and information relating to the locations at which DMPs are located, and may be downloaded, in one embodiment, from a DMP location scanner to a server or other computing system that is configured to analyze the information.

Once information relating to an association between the DMP and the work order is obtained, the information is verified in step 309. In general, such a verification may occur in a post-installation scenario, e.g., after initial installation. Verifying the information may include determining whether a QR code obtained from a DMP at a particular spatial location essentially matches the QR code associated with the DMP that is shown on a work order as the DMP that was to be installed at the particular location. It should be appreciated that the QR codes may be considered as being a match if the QR codes are paired. That is, matched QR codes are not limited to being identical QR codes but may, instead, be QR codes that are paired or otherwise substantially uniquely associated.

A determination is made in step 313 as to whether an analysis of the information relating to an association between a DMP and a work order indicates the DMP that is located at the particular location is located in the proper location for that DMP. In other words, it is determined whether analysis indicates that the DMP located at the particular location is in the correct place. As will be appreciated by those skilled in the art, such a determination may generally be associated with verifying the location of a previously installed DMP. If it is determined that the DMP at the particular location is in the correct place, then process flow moves to an optional step 317 in which a notification that the DMP is in its proper location is provided, and the method of analyzing captured information is completed. It should be appreciated that a notification that the DMP is in its proper location may be provided to an administrator of a large scale system of which the DMP is a part, and may also indicate that the DMP is connected to the display it was intended to be connected to.

Alternatively, if it is determined in step 313 that the DMP is not properly connected, e.g., not properly connected to a network, process flow moves to step 321 in which notification is provided, as for example to an administrator of a large scale system of which the DMP is a part, that the DMP is not properly connected, e.g., to a network. An administrator may then notify an installer that the DMP is not properly connected location.

Figure 4:
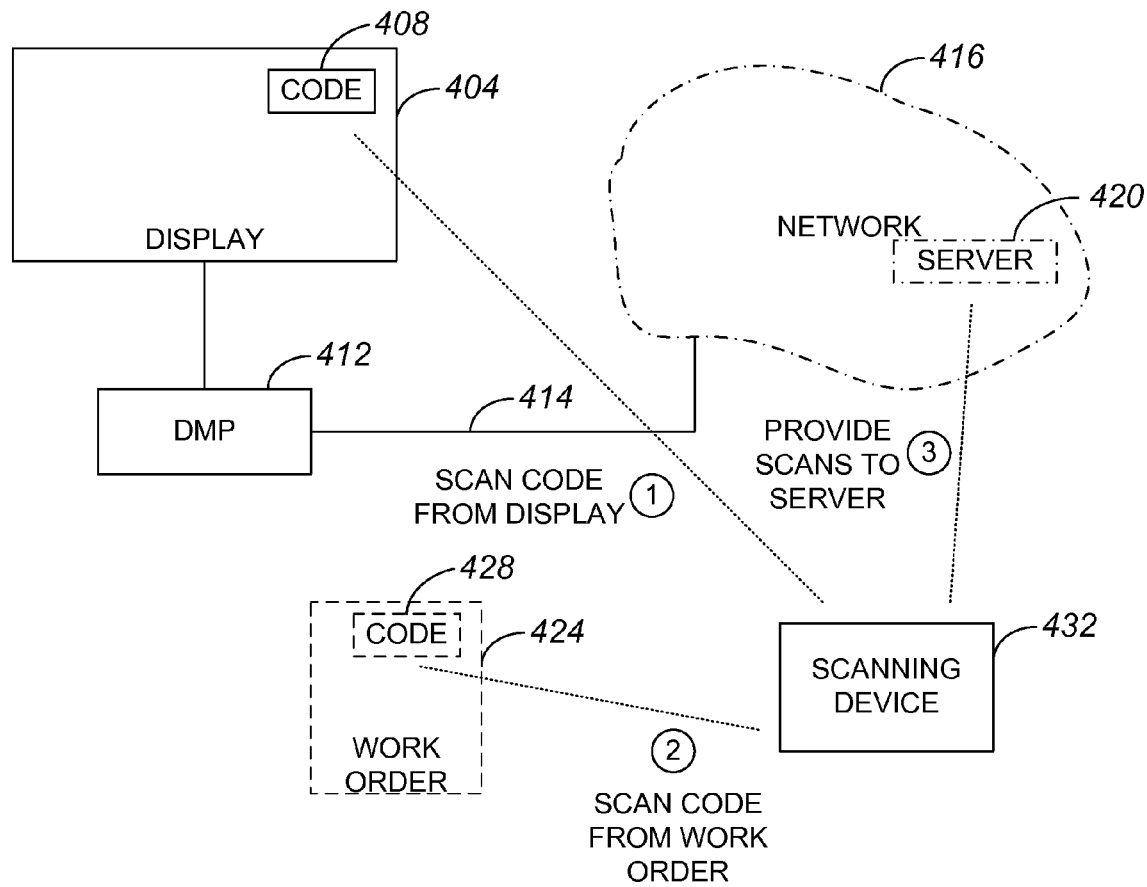
FIG. 4 is a diagrammatic representation of a system in which codes associated with a DMP may be used to verify that the DMP is properly located, e.g., during post-installation operations, in accordance with an embodiment.

As previously mentioned, DMPs may be deployed within large scale systems. A large scale system may be any networked system that utilizes DMPs to provide digital media that is to be displayed on various displays. A large scale system may be, for example, associated with a stadium vision system. Referring next to FIG. 4, one large scale system in which codes associated with a DMP may be used to verify that the DMP is properly located in accordance with an embodiment. A large scale system is associated with a network 416 that includes at least one network server 420. A DMP 412 is in communication with network 416 through a connection 414. Connection 414 may be a wireless connection or a wired connection, and may include both wireless portions and wired portions. Through connection 414, DMP 412 may exchange information or data with components within network 416. The exchange of information typically includes both obtaining and providing information.

DMP 412 is in communication with a display 404 that is arranged to display images provided by DMP 412. DMP 412 may be in communication with display 404 through the use of wireless interfaces or wired interfaces. A code 408, e.g., a QR code or a bar code, that identifies DMP 412 is displayed on display 404, typically when DMP 412 is first powered on after DMP 412 is initially deployed.

A work order 424 is generally documentation that may be used by an installer to determine, for example, where to deploy DMP 412 and what display 404 to substantially couple DMP 412 to. Work order 424 includes a code 428, e.g., a QR code or a bar code, that identifies DMP 412 and is paired to code 408.

Once DMP 412 is powered on and code 408 is displayed on display 404, a scanning device 432 may be used to scan code 408 from display 404. A successful scan of code 408 from display 404 may be indicated by a visual, audio, and/or tactile indication on scanning device 432. For example, a successful scan of code 408 from display 404 may be indicated by a flashing light on scanning device 432. After code 408 is successfully scanned from display 404, code 428 provided on work order 424 may be scanned using scanning device 432. A successful scan of code 428 from work order 424 may be indicated by a visual, audio, and/or tactile indication on scanning device 432. It should be appreciated that codes 408, 428 may be scanned in any order. That is, code 408 is not necessarily scanned before code 428.

In the described embodiment, upon scanning both code 408 and code 428, scanning device 432 may provide server 420 with information relating to scanned codes 408, 428, as well as information relating to the location at which DMP 412 is located, such that server 420 may process the information. Processing the information provided by scanning device 432 may include, but is not limited to including, determining whether DMP 412 is properly connected to network 416, whether DMP 412 is properly connected to display 404.

Scanning device 432 may be, in one embodiment, a DMP location scanner. A DMP location scanner may be configured to provide scanned codes to a server, e.g., server 420, for processing. One example of a DMP location scanner that is arranged to provide scanned codes to a server for processing will be described below with respect to FIG. 5. Alternatively, a DMP location scanner may be configured to process scanned codes. One example of a DMP location scanner that is arranged to process scanned codes will be discussed below with respect to FIG. 6.

Figure 5:
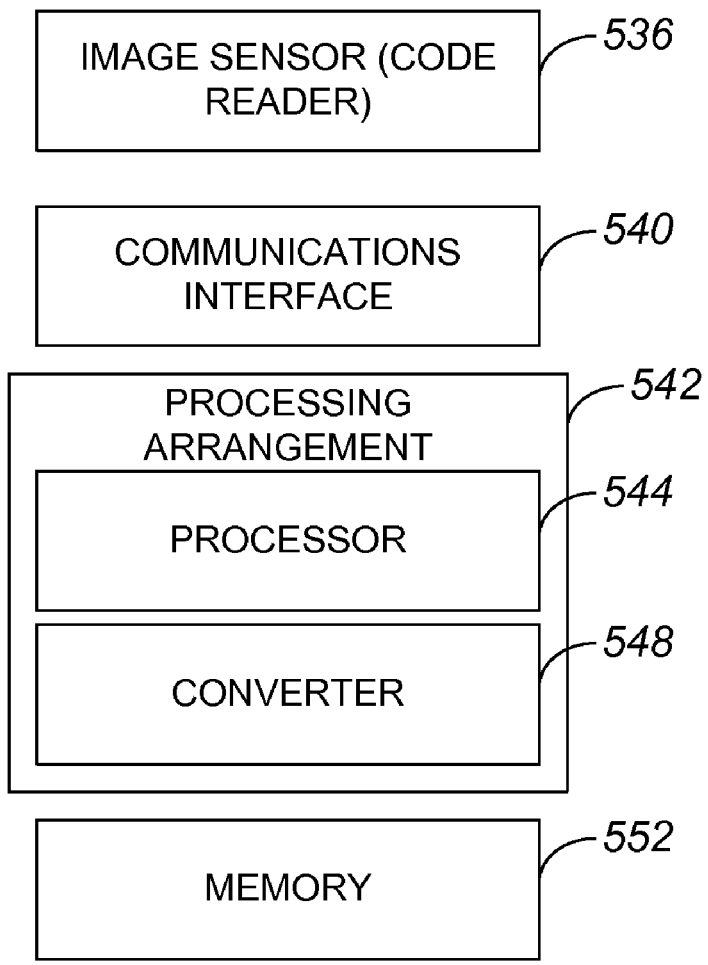
FIG. 5 is a diagrammatic representation of a first DMP location scanner in accordance with an embodiment.

FIG. 5 is a diagrammatic representation of a first DMP location scanner in accordance with an embodiment. A DMP location scanner 532 is configured to obtain codes, e.g., QR codes, and to provide the codes to an external device such as a server for processing. DMP location scanner 532 includes an image sensor 536 such as a code reader that is configured to effectively obtain a code displayed on a display screen and a code provided on a work order. In general, positioning image sensor 536 in close proximity to a code such as a QR code allows image sensor 536 to essentially read the code and to capture an image of the code.

DMP location scanner 532 also includes a communications interface 540 that allows DMP location scanner 532 to upload data to and/or to download data from an external device such as a computing system or a server associated with a communications network. Communications interface 540 may be, but is not limited to being, a wireless interface or a wired interface. In one embodiment, communications interface 540 may include a port that is arranged to accept a tangible medium, e.g., such as a flash memory card, onto which information may be loaded for transfer to an external device.

A processing arrangement 542 of DMP location scanner 532 includes a processor 544 and a converter 548. Processor 544 may be a microprocessor that is arranged to execute logic or computer program devices, e.g., computer code, such as logic operable to cooperate with image sensor 536 to record information associated with codes. Converter 548 may be hardware and/or software logic that cooperates with processor 544 to allow for a scanned code to converted into a digital image or bits.

A memory 552 is arranged to store software logic or computer program devices associated with DMP location scanner 532. Memory 552 is also arranged to store digital images or bits associated with codes scanned by image sensor 536 and converted by converter 548.

Figure 6:
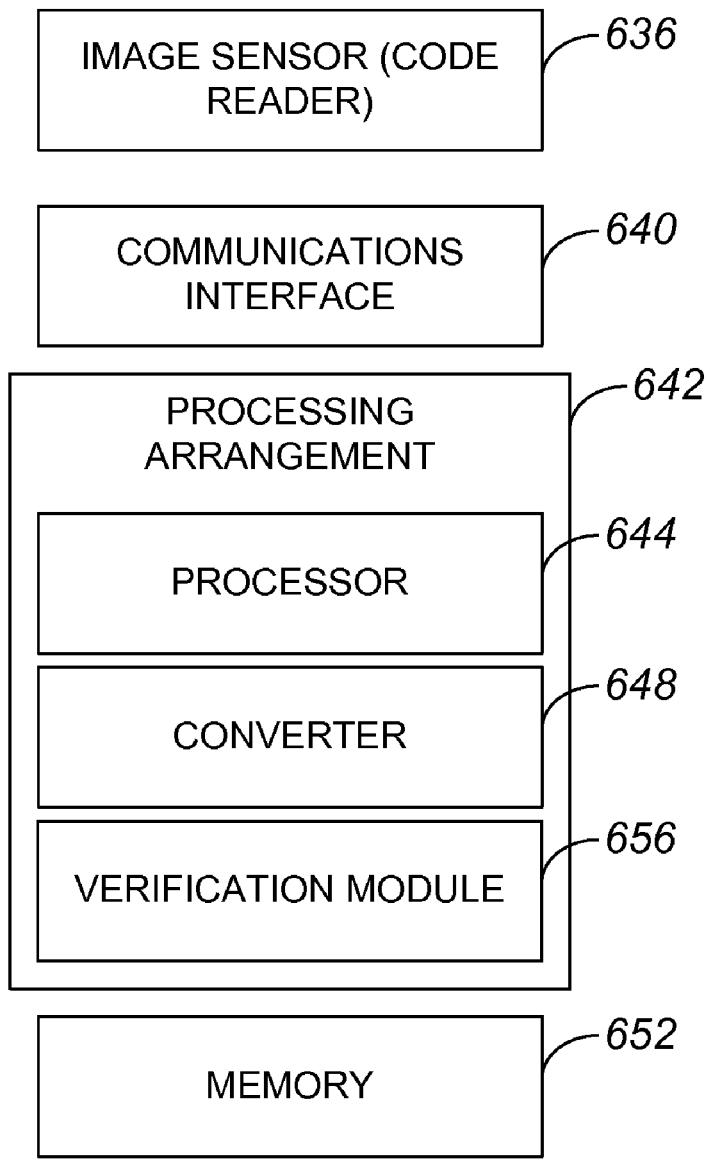
FIG. 6 is a diagrammatic representation of a second DMP location scanner in accordance with an embodiment.

While DMP location scanner 532 is arranged to scan codes such as QR codes, DMP location scanner 532 provides the scanned codes to an external device for processing. That is, DMP location scanner 532 provides a code scanned from a display screen coupled to a DMP and a code scanned from a work order to an external device such that the external device may ascertain whether the DMP is located in its designated location. FIG. 6 is a diagrammatic representation of a DMP location scanner that is arranged to determine whether a DMP is located in a designated location, as for example as part of a post-installation process, in accordance with an embodiment. A DMP location scanner 632 is configured to obtain a code displayed on a display and a code provided on documentation such as a work order, and may be configured to analyze the obtained.

DMP location scanner 632 includes an image sensor 636 such as a code reader and a communications interface 640. Image sensor 636 is configured to effectively obtain a code displayed on a display screen and a code provided on a work order. Communications interface 640 allows for the uploading of data to and/or the downloading of data from an external device such as a computing system or a server associated with a communications network. Communications interface 540 may include, but is not limited to being, a wireless interface, a wired interface, and/or a port that is arranged to accept a tangible medium, e.g., such as a flash memory card.

A processing arrangement 642 of DMP location scanner 632 includes a processor 644, a converter 648, and a verification module 656. Processor 644 may be a microprocessor that is arranged to execute logic or computer program devices, e.g., computer code, such as logic operable to cooperate with image sensor 636 to record information associated with codes. Converter 648 may be hardware and/or software logic that cooperates with processor 644 to allow for a scanned code to converted into a digital image or bits. Verification module 656 may be hardware and/or software logic that cooperates with processor to determine whether a code scanned from a display coupled to a DMP is considered a match to a code scanned from a work order, as well as to match a code associated with a DMP to a code associated with a work order. It should be appreciated that while two substantially identical codes are identified as matching, two codes may also generally be identified as matching if they are paired. In other words, codes that are mapped to each other may be considered as matching.

A memory 652 is arranged to store software logic or computer program devices associated with DMP location scanner 532. Memory 552 is also arranged to store digital images or bits associated with codes scanned by image sensor 636 and converted by converter 648. In the described embodiment, memory 652 may store information used by verification module 656 to associate two scanned codes as a match, and may also be arranged to determine whether two scanned codes match. For example, a data structure which stores associations or mappings between codes that are considered to be paired may be stored in memory 652 such that the data structure may be accessed by verification module 656.

Figure 7:
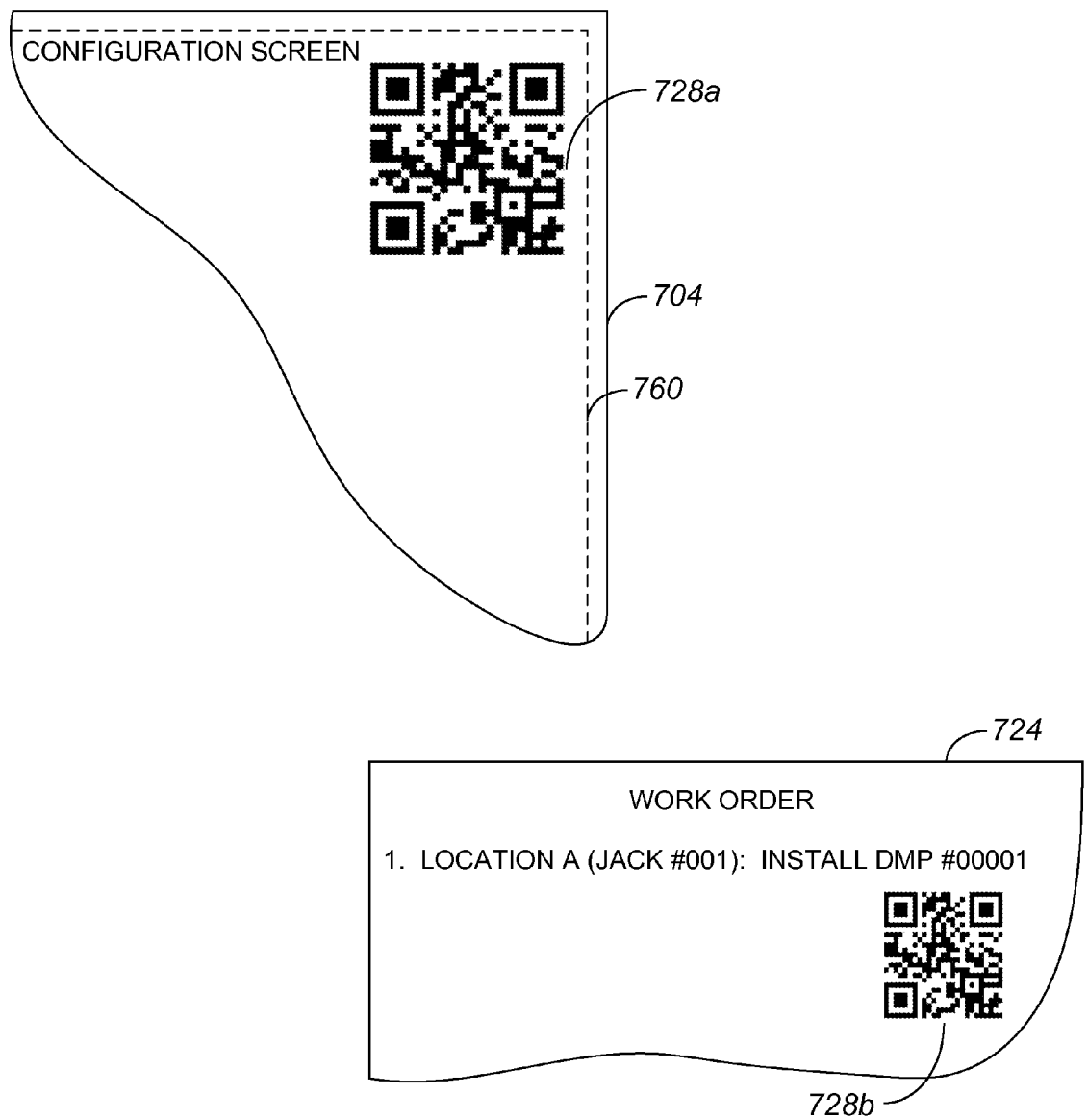
FIG. 7 is a diagrammatic representation of codes associated with a DMP as displayed on a display and on a work order in accordance with an embodiment.

Codes that are used to designate a DMP location, or point-of-deployment, may generally be embodied as any suitable identifying marks that are capable of being scanned. In one embodiment, QR codes may be used to determine whether a DMP is properly connected to a network and/or in communication with a correct display. FIG. 7 is a diagrammatic representation of QR codes associated with a DMP as displayed on a display and on a work order in accordance with an embodiment. A display 704 is in communication with a DMP (not shown. Display 704 may be, for example, connected to a DMP (not shown) using cables. When a display 704 and a DMP (not shown) are first in communication and powered up, a QR 728a code associated with the DMP is displayed as part of a configuration screen or installer template 760 that allows an installer to complete installation of the DMP.

A QR code 728b that is paired to QR code 728a is provided on a work order 724 that provides an installer with instructions on where and/or how to install a particular DMP (not shown). It should be appreciated that QR code 728a and QR code 728b are generally mapped or otherwise associated with each other, as discussed above. Thus, when a scanning device such as location scanner 532 of FIG. 5 or location scanner 632 of FIG. 6 are used to scan QR code 728a and QR code 728b, a match will be designated. In one embodiment, QR code 728a indicates an association between display 704 and work order 724 while QR code 728b identifies the DMP. The association between display 704 and work order 724 may include an indication of the spatial location of the DMP.

Although only a few embodiments have been described in this disclosure, it should be understood that the disclosure may be embodied in many other specific forms without departing from the spirit or the scope of the present disclosure. By way of example, although a two-dimensional identification code such as a QR code has generally been described, an identification code is not limited to being a two-dimensional identification code. An identification code may be, in some cases, a one-dimensional bar code, a text code, or any suitable visual code that is capable of being scanned.

A DMP location scanner may store scanned QR codes, in addition to location information, locally. The scanned QR codes and location information may be transmitted to a server periodically such that the QR codes and location information may be analyzed. Alternatively, rather than transmitting the scanned QR codes and location information, a DMP location scanner may be given by an installer to his or her supervisor such that the supervisor may download the scanned QR codes and location information for analysis.

In one embodiment, a DMP location scanner may be configured to analyze scanned QR codes and location information, as discussed above. For example, a DMP location scanner may include a USB On-The-Go (OTG) interface that allows the DMP location scanner to act as a host that is capable of analyzing QR codes and location information.

A DMP location scanner has been described as including an image sensor. In general, a DMP location scanner may utilize suitable apparatus and/or method to capture an image or to otherwise read a code. For example, a DMP location scanner may utilize a camera to effectively take a picture of a code such as a QR code. Pictures of codes may be compared to determine whether the codes are a match without departing from the spirit or the scope of the present disclosure.

In one embodiment, a large scale system may include different classes of DMPs. For example, some DMPs may support substantially only displaying text while other DMPs may support displaying video. When there are different classes of DMPs, if a DMP of a particular class is at a location that is intended to host a DMP of that particular class, as long as a DMP of that particular class is deployed at the location, that DMP may be verified as being in a correct location. In other words, it may be possible to use codes to verify that a particular class of DMP is at a point of deployment, in lieu of using codes to verify that a particular DMP is at the point of deployment.

The embodiments may be implemented as hardware and/or software logic embodied in a tangible medium that, when executed, is operable to perform the various methods and processes described above. That is, the logic may be embodied as physical arrangements, modules, or components. A tangible medium may be substantially any suitable physical, computer-readable medium that is capable of storing logic which may be executed, e.g., by a computing system, to perform methods and functions associated with the embodiments. Such computer-readable media may include, but are not limited to including, physical storage and/or memory devices. Executable logic may include code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present disclosure may vary widely. Steps may be added, removed, altered, combined, and reordered without departing from the spirit of the scope of the present disclosure. For example, when a DMP location scanner is used to obtain a QR code of a DMP that is displayed on a display and a QR code provided on a work order, the order in which the QR codes are obtained may vary. Therefore, the present examples are to be considered as illustrative and not restrictive, and the examples is not to be limited to the details given herein, but may be modified within the scope of the appended claims.

What is claimed is:

1. A method comprising:
    obtaining documentation, the documentation including a first identifying code, the documentation further including information relating to a deployment of a media device;
    deploying the media device at a location, wherein deploying the media device at the location includes connecting the media device to a display device;
    causing a second identifying code to be displayed on the display device, the second identifying code being indicative of an association between the display device and the documentation;
    capturing the first identifying code and the second identifying code; and
    pairing the first identifying code with the second identifying code.

2. The method of claim 1 wherein deploying the media device at the location further includes connecting the media device to a communications network.

3. The method of claim 2 wherein pairing the first identifying code with the second identifying code allows a determination of when the media device is not property connected to the communications network or the media device is not properly connected to the display device.

4. The method of claim 1 wherein capturing the first identifying code and the second identifying code includes capturing the first identifying code and the second identifying code using a scanning device.

5. The method of claim 1 wherein the first identifying code identifies the media device.

6. The method of claim 1 wherein the first identifying code is a first quick response (QR) code and the second identifying code is a second QR code.

7. The method of claim 1 wherein the media device is a digital media player (DMP) and the documentation is a work order.

8. An apparatus comprising:
    means for generating documentation, the documentation including a first identifying code, the documentation further including information relating to a deployment of a media device;
    means for causing a second identifying code to be displayed on a display device connected to the media device at a location, the second identifying code being indicative of an association between the display device and the documentation;
    means for obtaining the first identifying code and the second identifying code; and
    means for pairing the first identifying code with the second identifying code.

9. A computer-readable medium comprising computer program code, the computer program code, when executed, configured to:
    generate documentation, the documentation including a first identifying code, the documentation further including information relating to a deployment of a media device;
    cause a second identifying code to be displayed on a display device couple to the media device at a location, the second identifying code being indicative of an association between the display device and the documentation;
    obtain the first identifying code and the second identifying code; and
    pair the first identifying code with the second identifying code.

10. The apparatus of claim 9 wherein the computer program code configured to pair the first identifying code with the second identifying code allows a determination of when the media device is not property connected to the communications network or the media device is not properly connected to the display device.

11. The apparatus of claim 9 wherein the computer code configured to obtain the first identifying code and the second identifying code is further configured to obtain the first identifying code and the second identifying code from a scanning device that captured the first identifying code from the documentation and the second identifying code from the display.

12. The apparatus of claim 9 wherein the first identifying code identifies the media device.

13. The apparatus of claim 9 wherein the first identifying code is a first quick response (QR) code and the second identifying code is a second QR code.

14. The apparatus of claim 9 wherein the media device is a digital media player (DMP) and the documentation is a work order.

15. An apparatus comprising:
an image sensor, the image sensor being configured to capture a first identifying code from documentation relating to a deployment of a digital media player (DMP) at a spatial location and to capture a second identifying code displayed on a display that is in communication with the DMP, the second identifying code being arranged to indicate an association between the documentation and the display; and
a processing arrangement, the processing arrangement being arranged to associate the first identifying code with the second identifying code, the processing arrangement further being configured to determine whether the first identifying code is paired with the second identifying code, wherein when it is determined that the first identifying code is paired with the second identifying code, the spatial location is a designated point-of-deployment for the DMP.

16. The apparatus of claim 15 wherein the first identifying code is a quick response (QR) code associated with the DMP and the second identifying code is a QR code.

17. The apparatus of claim 15 wherein when it is determined that the first identifying code is not paired with the second identifying code, the spatial location is not the designated point-of-deployment for the DMP.

18. A method comprising:
obtaining documentation, the documentation including a first identifying code, the documentation further including information relating to a deployment of a media device;
deploying the media device at a location, wherein deploying the media device at the location includes connecting the media device to a display device;
causing a second identifying code to be displayed on the display device, the second identifying code being indicative of an association between the display device and the documentation;
capturing the first identifying code and the second identifying code; and
determining whether the first identifying code is paired with the second identifying code, wherein when it is determined that the first identifying code is paired with the second identifying code, the location is a designated point-of-deployment for the media device.

19. The method of claim 18 wherein deploying the media device at the location further includes connecting the media device to a communications network.

20. The method of claim 19 wherein when it is determined that the first identifying code is not paired with the second identifying code, the media device is not properly connected to the communications network or the media device is not properly connected to the display device.

* * * * *

UNITED STATES PATENT AND TRADEMARK OFFICE
CERTIFICATE OF CORRECTION

PATENT NO. : 8,348,147 B2  
APPLICATION NO. : 12/972717  
DATED : January 8, 2013  
INVENTOR(S) : Robert M. Bracalente and John A. Toebes Page 1 of 1

It is certified that error appears in the above-identified patent and that said Letters Patent is hereby corrected as shown below:

ON THE TITLE PAGE:

under Item (75) Inventors:

"Robert M. Bracalente, Wake Forest, CA (US); John A. Toebes, Cary, NC (US)"

should be:
- Robert M. Bracalente, Wake Forest, NC (US); John A. Toebes, Cary, NC (US) - under Item (74) Attorney, Agent, or Firm:

"P. Shu"

should be:
-P. Su-

Signed and Sealed this
Twelfth Day of February, 2013

Teresa Stanek Rea
*Acting Director of the United States Patent and Trademark Office*